US009325894B2

(12) United States Patent
McClellan

(10) Patent No.: US 9,325,894 B2
(45) Date of Patent: Apr. 26, 2016

(54) DISTRIBUTED VISION SYSTEM WITH MULTI-PHASE SYNCHRONIZATION

(71) Applicant: James R. McClellan, Grand Rapids, MI (US)

(72) Inventor: James R. McClellan, Grand Rapids, MI (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 14/252,825

(22) Filed: Apr. 15, 2014

(65) Prior Publication Data

US 2015/0049212 A1 Feb. 19, 2015

Related U.S. Application Data

(63) Continuation of application No. 12/648,801, filed on Dec. 29, 2009, now Pat. No. 8,704,903.

(51) Int. Cl.
*H04N 7/173* (2011.01)
*H04N 5/232* (2006.01)
(Continued)

(52) U.S. Cl.
CPC ........... *H04N 5/23206* (2013.01); *H04N 5/232* (2013.01); *H04N 5/247* (2013.01); *H04N 21/242* (2013.01); *H04N 21/4302* (2013.01)

(58) Field of Classification Search
CPC .......................... H04N 5/23206; H04N 5/232
USPC ..................................................... 348/211.3
See application file for complete search history.

(56) References Cited

U.S. PATENT DOCUMENTS 6,175,652 B1 1/2001 Jacobson et al.
6,483,935 B1 11/2002 Rostami et al.
(Continued)

FOREIGN PATENT DOCUMENTS

GB 2452765 3/2009
WO WO2007110822 10/2007
WO WO 2007110822 A1 * 10/2007

OTHER PUBLICATIONS

Martinez, et al., "A Modular and Scalable Architecture for PC-Based Real-Time Vision System", *Real-Time Imaging, Academic Press Limited*, GB, Col. 9, No. 2, Apr. 1, 2003, 14 pages.

(Continued)

*Primary Examiner* — Jason Flohre
*Assistant Examiner* — Dwight C Tejano
(74) *Attorney, Agent, or Firm* — Loginov & Associates, PLLC

(57) ABSTRACT

This invention provides a system and method for synchronization of vision system inspection results produced by each of a plurality of processors that includes a first bank (that can be a "master" bank) containing a master vision system processor and at least one slave vision system processor. At least a second bank (that can be one of a plurality of "slave" banks) contains a master vision system processor and at least one slave vision system processor. Each vision system processor in each bank generates results from an image acquired and processed in a given inspection cycle. The inspection cycle can be based on an external trigger or other trigger signal, and it can enable some or all of the processors/banks to acquire and process images at a given time/cycle. In a given cycle. each of the multiple banks can be positioned to acquire an image of a respective region of a plurality of succeeding regions on a moving line. A synchronization process (a) generates a unique identifier and that passes a trigger signal with the unique identifier associated with the master processor in the first bank to each of the slave processor in the master bank and each of the master and slave processor and (b) receives consolidated results via the master processor of the second bank, having the unique identifier and consolidated results from the results from the first bank. The process then (c) consolidates the results for transmission to a destination if the results are complete and the unique identifier of each of the results is the same.

12 Claims, 5 Drawing Sheets

(51) Int. Cl.
  *H04N 5/247* (2006.01)
  *H04N 21/242* (2011.01)
  *H04N 21/43* (2011.01)

(56) References Cited

U.S. PATENT DOCUMENTS

| | | | |
|---|---|---|---|
| 6,826,173 | B1 | 11/2004 | Kung et al. |
| 6,970,183 | B1 * | 11/2005 | Monroe ................ 348/143 |
| 7,369,680 | B2 | 5/2008 | Trajkovic et al. |
| 7,567,914 | B2 | 7/2009 | Bonissone |
| 7,671,893 | B2 | 3/2010 | Li et al. |
| 2002/0171741 | A1 | 11/2002 | Tonkin et al. |
| 2005/0216186 | A1 | 9/2005 | Dorfman et al. |
| 2009/0027509 | A1 | 1/2009 | Giesen |
| 2010/0157020 | A1 | 6/2010 | Choi et al. |
| 2011/0157389 | A1 | 6/2011 | McClellan |
| 2013/0073847 | A1 | 3/2013 | Scherer et al. |

OTHER PUBLICATIONS

Bermbach, et al., "Industrial Image Processing System Allows Parallel Computing on Sensor Data", *Proceedings of SPIE—International Society for Optical Engineering*, US. vol. 804, Apr. 1, 1987, 9 pages.

* cited by examiner

DISTRIBUTED VISION SYSTEM WITH MULTI-PHASE SYNCHRONIZATION

This application is a continuation of U.S. patent application Ser. No. 12/648,801, titled "Distributed Vision System with Multi-Phase Synchronization," filed on Dec. 29, 2009, the entire contents of which is hereby incorporated herein by reference.

FIELD OF THE INVENTION

This invention relates to vision systems for use in inspecting parts, objects and surfaces, and more particularly to multi-camera vision systems.

BACKGROUND OF THE INVENTION

The use of advanced vision systems (also termed "machine vision") and their underlying software is increasingly employed in a variety of manufacturing and quality control processes. Machine vision enables quicker, more accurate and repeatable results to be obtained in the production of both mass-produced and custom products. Typical machine vision systems include one or more cameras (typically having solid-state charge couple device (CCD) or CMOS-based imaging elements) directed at an area of interest, a frame grabber/image processing elements that capture and transmit CCD images, one or more computers or onboard processing devices, and a user interface for running the machine vision software application and manipulating the captured images, and appropriate illumination on the area of interest.

The use of multiple cameras (also termed "sensors"), is desirable in many vision system applications. Such a multi-camera machine vision system arrangement can allow for a part or object on a moving line, to be simultaneously or sequentially imaged from several vantage points, increasing the reliability of the inspection process by taking into account features in certain views that may be occluded in other views. Thus, the use of multiple image processing devices, often one per camera can allow for faster line speeds, as multiple processing devices may work simultaneously to inspect a single part or group of parts. The processing devices may be physically adjacent or they may be widely separated and connected via a network or other communication channel. This is known as a distributed system or application because the processing capability is physically distributed among multiple devices. Greater line speeds are possible using additional processing devices, such that each device or group of devices inspects one of a plurality of adjacent objects in each inspection cycle (typically governed by a clock and trigger signal). For example, in a given inspection cycle a first camera or group of cameras images a first part (a discrete object or a region of an object or surface), a second camera/camera group simultaneously images the next adjacent part on the line and a third camera/camera group simultaneously images a third adjacent part on the line. Multiple processing devices, typically one per camera or one per group of cameras, work simultaneously to inspect all three parts at once. This is known as a multi-phase system where, in this example, three inspection phases are carried out simultaneously within a single inspection cycle.

Generally, in a distributed machine vision application, multiple processing subsystems acquire and process respective multiple images pertaining to a single part or inspection cycle and communicate these results over a network or other communication channel. In order to generate a valid overall result for a given inspection cycle, the results generated by all processors in the distributed system are combined in such a way that ensures that all result values pertain to the same inspection cycle. Since each inspection result can have an unpredictable processing time, it is sometimes difficult to determine if a given result pertains to a specific inspection cycle or another inspection cycle. The system as a whole must have a means to automatically detect and recover from transient problems such as missed or extra trigger signals, temporary power interruption to one or more subsystems, and unreliable communication channels. In applications that require substantial processing power it may be necessary to distribute a single inspection task among multiple processors, which renders synchronizing the results even more challenging.

By way of background, many manufacturers of machine vision technology offer multi-camera systems in the literal sense—multiple cameras, all feeding a single processor box, which is typically defined by a PC, or a standalone processing unit. The central processing unit (CPU) in such a multi-camera system controls when the cameras are triggered to acquire an image, and stores the acquired images in memory, whereby the application can associate the appropriate images to the application.

Many distributed multi-camera applications employ a programmable logic controller (PLC) to synchronize and combine results from discrete vision systems in the overall arrangement. In the absence of any synchronization capability within the vision systems themselves, this is the standard solution to the problem of synchronization.

Certain vision systems, such as the In-Sight® product available from Cognex Corporation of Natick, Mass. include a WriteResult and ReadResult command within their vision system applications. In-Sight is a self-contained camera assembly with an onboard processing device, capable of communicating with a network via appropriate networking protocols, such as Ethernet. The WriteResult and ReadResult commands allow discrete, interconnected vision systems to share data over a network. In this manner, one vision system can act as a master processor, and one or more others can act as slave processors. If one of the vision systems is a master camera, it can be used to trigger slave camera(s) via Ethernet in a way that ensures that the results received from the slave camera(s) are identified as part of the current inspection cycle. In typical arrangements, the combined vision system results for the inspection cycle are commonly communicated from the master camera to a PLC, where they are analyzed and a final result or results is/are determined.

As described above, in order to apply more processing power, existing vision system applications have been solved using duplicate systems triggered in sequential phases. This can be termed a "multi-phase" approach herein. The simplest example uses two cameras and two processors, with each system inspecting every other part. More complex applications can use multiple banks of cameras, for example three banks of cameras and processors each inspecting every third part, with any number of cameras in each bank. It is possible to synchronize and serialize the results externally in a PLC or, with difficulty, using networking data functions within the vision system, such as WriteResult and ReadResult.

Nevertheless, it proves very challenging and time-consuming to provide a reliable PLC application that correctly synchronizes results at high speed and can recover from many types of transient problems that may affect synchronization of the results of a given inspection cycle. Additionally, placing the burden of synchronization on the PLC adds cost and complexity to the application, and makes it more difficult to maintain due to the "vision logic" in the PLC program that typically also controls the process equipment.

One approach to ensuring synchronization is to provide a central processor for all machine vision tasks interconnected to multiple dumb cameras (i.e. cameras that simply acquire images). However, this approach suffers from a lack of scalability. As more cameras are added, additional burden is placed on the processor, which is contemporaneously receiving a plurality of images for machine-vision processing. In some cases it is possible to add co-processors to increase the machine vision processing capability, but it offers very limited scalability compared to a distributed system on a network and it is difficult to use in a multi-phase approach.

Available networked vision system functions, such as WriteResult and ReadResult, tend to provide reliable results only when a master system triggers the slave system via Ethernet/network links and protocols. That is, such functions do not synchronize results when using external, hard-wired trigger signals. The use of external triggers is common where encoders, presence sensors (e.g. photodetectors), and the like are employed to track the motion and location of parts along a moving line and/or regions of interest on a surface, such as a moving web. Each system is triggered when predetermined motion has occurred. One particular concern occurs when a sensor misses a trigger (due, for example to an unreliable photodetector), then the result for that system may not occur and the overall system will thereafter lose synchronization, as the next trigger for that system may be assumed to produce the result for the previous cycle. This limitation severely restricts the speed at which such a master-slave system can operate, and renders it unusable for many applications. Also, these system functions make the application difficult to maintain, because each slave job must receive a WriteResult function that exactly matches the sequence of results expected by the master, and if the sequence is incorrect, there is no reliable way to detect the this error. Moreover, such network-based system functions limit scalability because they are impractical to maintain across a multiplicity of interconnected subsystems. More generally, networked approaches may be too slow for use in high-speed multi-phase, multi-camera arrangements, because prior applications of those approaches were more suited to triggers occurring in the millisecond range, rather than the microsecond time base desired for high-speed operation.

With a multi-phase system using multiple banks of processors each inspecting every Nth part, synchronizing results in a PLC or directly between processors is extremely challenging and often impractical. Overcoming these limitations has, to date, consisted of employing a more-powerful processor if available and cost-effective, accepting the fact that performance will be suboptimal, or otherwise avoiding use of a multi-phase system arrangement.

It is, therefore, desirable to provide a system and method to synchronize inspections in a given cycle, and to combine results from multiple distributed processors into a single processor, in a reliable way. This system and method should allow recovery from most types of intermittent signaling problems and other temporary problems (missing triggers, lost parts, etc.). The arrangement should desirably tolerate unpredictable network delays, and be capable of high speed operation with a variety of triggering methods including hardwired, external triggering. The system and method should also allow the ability to scale applications to even higher speeds through multi-phase synchronization, in a way that is transparent to the user, and that renders the external communication straightforward.

SUMMARY OF THE INVENTION

This invention overcomes disadvantages of the prior art by providing a fault-tolerant system and method for synchronizing the inspection results of a scalable plurality of vision system processors that allows for rapid recovery from a variety of problems, such as missed triggers, extra triggers and power loss at one or more system processors. In an illustrative embodiment, the invention provides a system and method for synchronization of vision system inspection results produced by each of a plurality of processors that includes a first bank (that can be a "master" bank) containing a master vision system processor and at least one slave vision system processor. At least a second bank (that can be one of a plurality of "slave" banks) contains a master vision system processor and at least one slave vision system processor. Each vision system processor in each bank generates results from one or more images acquired and processed in a given inspection cycle. In an embodiment, processors are each associated with a given camera. In other embodiments the processors in one or more processor banks are associated with one or more shared cameras. The inspection cycle can be based on an external trigger or other trigger signal, and it can enable some or all of the processors/banks to acquire and process images at a given time/cycle. In a given cycle, each of the multiple banks can be positioned to acquire an image of a respective region of a plurality of succeeding regions on a moving line. The next cycle acquires and processes images of a next grouping of objects or regions along the line—providing processing time between each movement of the groups of parts into the field of view of the each camera. A synchronization process (a) generates a unique identifier and that passes a trigger signal with the unique identifier associated with the master processor in the first bank to each of the slave processor in the master bank and each of the master and slave processor and (b) receives consolidated results via the master processor of the second bank, having the unique identifier and consolidated results from the results from first bank. The process then (c) consolidates the results for transmission to a destination if the results are complete and the unique identifier of each of the results is the same.

In an illustrative embodiment, synchronization process can reside in the master processing device of the first or "master" bank. Alternatively overall consolidation of results for synchronization can be accomplished by an interconnected processor that receives results from each bank's master vision system processor. Communication between banks and with the synchronization process can be accomplished using a network link, such as Ethernet. Each processing device records a timestamp when each result is generated or each image is acquired. Such timestamps assist in assuring that received results during consolidation are part of the same inspection cycle—particularly where independent triggers are employed in different processors and/or processor banks. The timestamps can be simply generated based on the relative time at which a message is sent by a master and received by slave devices. For increased timing accuracy, the various processing devices in the overall system can be tied together by a reference clock system, based upon a master clock that transmits signals to other clocks over the network. The complete, consolidated results (or an error if the results are incorrect or incomplete) are transmitted to a destination, such as a line controller. The controller can be used to operate a motion control system or device, part ejector, line shutdown or alert used to indicate an inspection condition that requires such action (e.g. a defective part requiring ejection or a defective web section that requires marking and removal). In general vision system processors are associated with cameras that are positioned to acquire images of various locations on the line or are positioned by a motion control device—in which case a single camera can image variable locations.

BRIEF DESCRIPTION OF THE DRAWINGS

The invention description below refers to the accompanying drawings, of which.

DETAILED DESCRIPTION

Figure 1:
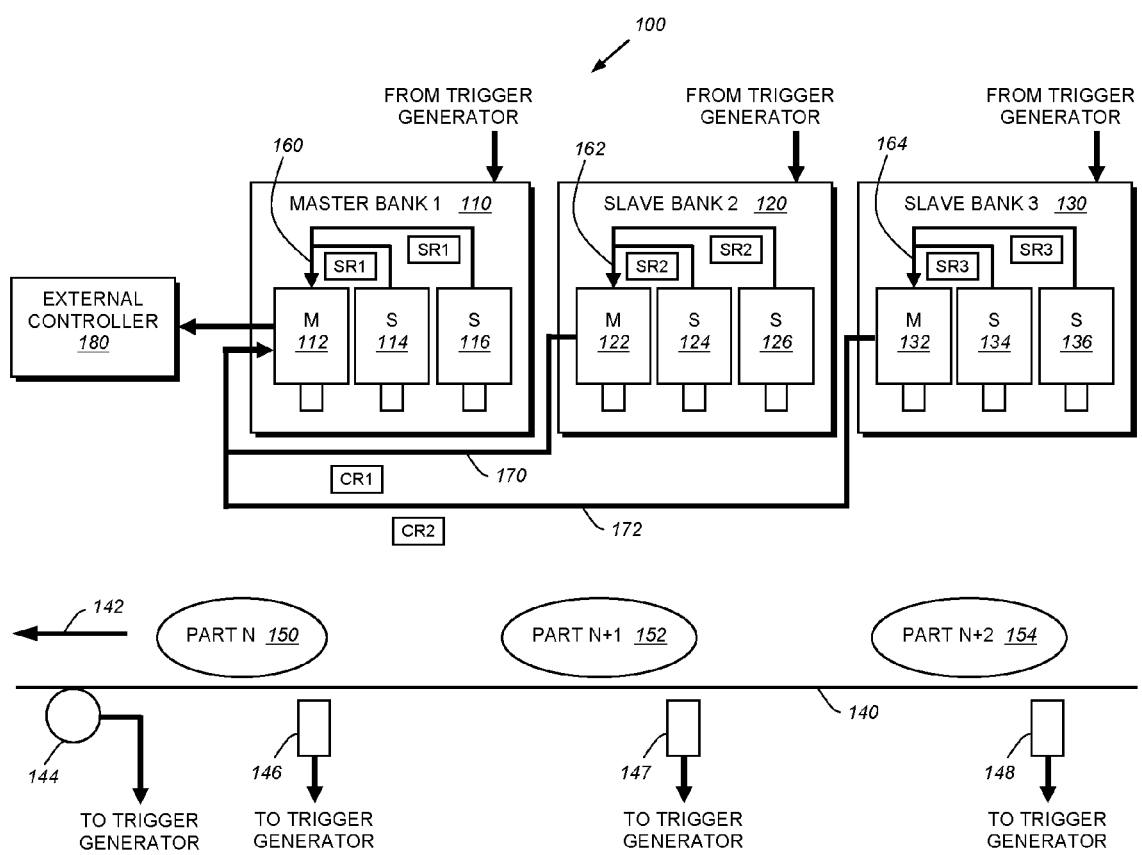
FIG. 1 is a block diagram of an exemplary arrangement of vision system cameras and processors with respect to parts or other regions of interest on a moving line in accordance with an illustrative embodiment.

FIG. 1 is a schematic diagram of an exemplary arrangement of a multi-phase, multi-processor machine vision system 100 according to an illustrative embodiment. This arrangement 100 is exemplary of a wide variety of possible camera arrangements according to illustrative embodiments. The number of cameras and their placement is widely variable. In this example, each camera is assumed to contain an independent processing device. In other arrangements the processing devices may be physically separated from the cameras, and any given processing device may process images from one or more cameras. Likewise, cameras can be physically or optoelectronically manipulated by a motion control device (blocks 202 in FIG. 2 and 302 in FIG. 3) to allow variable acquisition of images from multiple or variable locations. As shown, the exemplary arrangement includes three vision system processor banks 110, 120, 130. In this exemplary arrangement, the processors are each associated with a camera/sensor. In alternate embodiments, the processors and/or processor banks can share one or more cameras/sensors. Where a given processor shares a given camera, a multiplexer can be employed (not shown) in a conventional arrangement to allow acquired images to be directed to each processor as appropriate. Where banks each share a given camera or cameras, the access to a camera can be sequential, using an appropriate controller (also not shown). Each bank 110, 120 and 130, respectively is associated with three discrete, respective, vision system cameras (112, 114, 116), (122, 124, 126) and (132, 134, 136) in this exemplary embodiment. The cameras are positioned to image locations along a moving line 140 that transports parts/objects (arrow 142) downstream through the field of view of each camera bank. In an illustrative embodiment the line 140 can be operatively connected with an encoder 144, or other motion-measuring device. A series of presence detectors 146, 147, 148 can be provided with respect to the banks 110, 120, 130 in illustrative embodiments. The detectors 146, 147, 148 can be conventional photodetectors in an embodiment. They detect the passage of each part or object, Part N (150), Part N+1 (152), Part N+2 (154) into the field of view of the respective bank 110, 120, 130. Note that the term "object" as used herein can include discrete parts, or a discrete region of an overall part or surface. For example an "object" as defined herein can comprise a region of a continuous web moving through the field of view of each bank.

Illustratively, the encoder 144 and/or detectors 146, 147, 148 provide a signal to a trigger generation circuit of conventional design. The trigger generation circuit can provide an external trigger to each of the banks and/or cameras in various embodiments. In a basic example of a triggering arrangement, the external trigger is applied to each camera simultaneously upon every third part passing through each banks' field of view. At that time an image is acquired of the respective part or object within the field of view of each camera. The use of multiple processing devices in a bank helps to ensure that a fast-moving part is fully imaged and processed by the vision system by one or more processors (in whole or in part by each processor) prior to the next inspection cycle. By way of example, each camera associated with a bank can inspect a particular feature (cap, barcode, label), etc., and the master combines these results to determine whether the inspection is complete and valid. Again, it should be clear that the number and arrangement of discrete cameras and/processors is highly variable and the number of cameras or processors associated with one bank can differ from that in another bank. Likewise, while the inspection cycle is based on a simultaneous trigger event in this example, images can be acquired and processed based upon independent trigger events or other factors (such as a self-triggering vision system process within one or more processors). Note that the next inspection cycle in this example would operate so that bank 110 inspects Part N+3 (not shown), while banks 120 and 130 respective inspect Parts N+4 and N+5 (not shown).

The processors in the various banks are interconnected using a common Ethernet network represented by the links between processors and associated cameras in the banks as shown. It is expressly contemplated that other networking/communication topologies can be employed in alternate embodiments. As shown, by way of example, the depicted left most bank 110 is designated as a "Master" bank and the center and rightmost banks 120, 130 are "Slave" banks. Likewise, within each bank, one processor "M" is a master 112, 122, 132, and two interconnected processors are slaves "S" 114, 116, 124, 126, 134, 136 within the particular bank. The links 160, 162 and 164 define the flow of results SR1, SR2, SR3 from slaves to the master system within each bank. The links 170, 172 represent the flow of consolidated results CR1, CR2 for the inspection of each part 152, 154 sent to the overall system master 112 in bank 110. This master 112 can, in turn, send a complete set of results for all three parts 150, 152, 154 to an external controller 180. The external controller 180 (a PLC, for example) coordinates the results of all processors, and can be used to issue alerts, operate a motion control system or part ejector, stop the line, or identify a good/bad part or surface region. It can include an application that interprets results or can be a basic input/output device (for example operating a part ejector/kicker). In some embodiments the overall system master 112 may directly control equipment such as a part ejector, without the need for an external controller 180. It should be clear that system throughput can increase almost linearly as more banks of cameras and processing devices are added to the overall arrangement, assuming that the consolidation of results requires far less processing resources than the inspection processing, which occurs natively in each processing device. In principle, this type of hierarchy can be extended indefinitely but in practice two levels as depicted provides superior results for a wide range of applications.

By interconnecting the controller 180 via a single master 112, the PLC or other external controller is free of multiple inputs requiring external synchronization that would otherwise increase the processing overhead of the controller. Rather a synchronized and consolidated result is delivered for each inspection cycle. This consolidated result may not include all the underlying system results (due to a missed trigger in one or more processors, etc.), but the next cycle that contains all needed results comprises a system recovery with full synchronization of the results in that recovered cycle being guaranteed.

Figure 2:
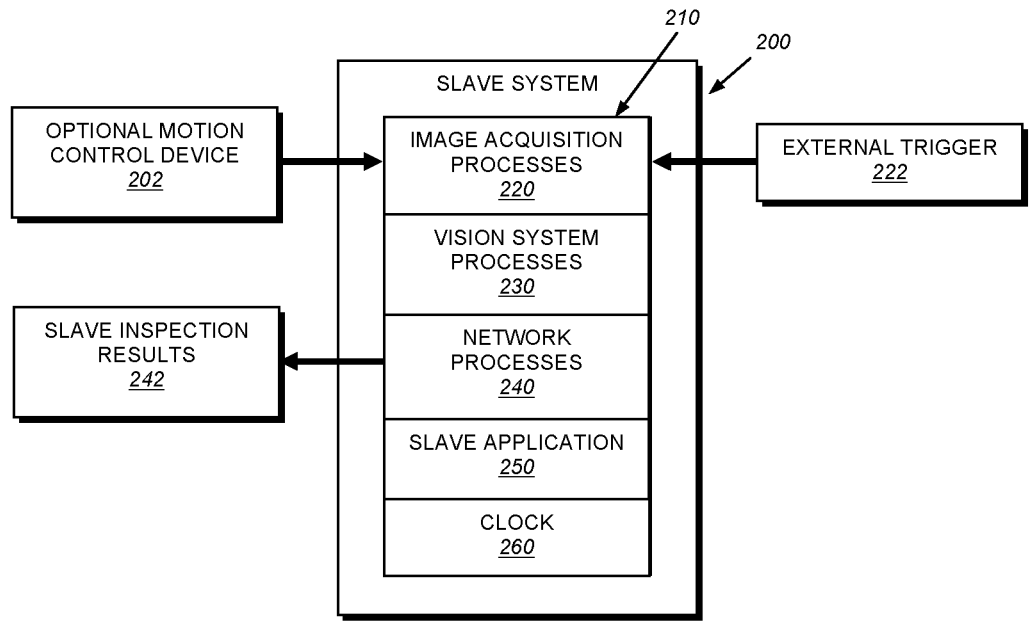
FIG. 2 is a block diagram showing the applications resident in an illustrative slave processor system of FIG. 1.

Reference is made to FIG. 2, schematically depicts the generalized applications 210 resident in each slave processor system 200. This arrangement is illustrative of a wide variety of possible organizations that can be implemented as hardware, software or a combination of hardware and software. The system 200 includes an image acquisition process (or processes) 220 that receives external trigger signals 222 from an appropriate source as described above. The trigger signals can also comprise internal trigger instructions received from other applications within the system or via the network. The image acquisition process(es) 220 are responsible for imaging the part, object or region of interest at the appropriate time. Each acquired image is stored and analyzed/processed by the vision system process(es) 230. The vision system processes employ any acceptable inspection or vision application, including those using trained images of a model part, object or surface (subject). The process may include pass/fail inspection, location of features in up to four dimensions (i.e. the location of objects in three physical dimensions plus the fourth dimension—location of the object in time), reading of characters or symbolic codes, measurement of dimensions, color etc. The vision system processes determine whether a given subject complies with predetermined inspection rules and generates an absolute value (pass/fail), a score or other information with respect to each inspected subject.

The slave system 200 further includes network processes 240 that allow for communication with other devices, including other master and slave processor systems. The network processes can employ conventional Ethernet or other physical communication channels, and may use TCP/IP or any other acceptable protocol such as UDP to facilitate communication. The data generated by the vision system processes 230, including inspection results 242, is directed over the network using the network processes 240. The results 242 are addressed to a bank master processor system. As described below, the slave application 250 provides synchronization information (timestamps, sequential identifiers, etc.) to the inspection results 242. The slave application can be alternately defined as a series of send applications that transmit information to a master, and receive applications that receive information from a master as needed to perform the functions described herein. The timing of various devices is maintained and synchronized using a clock circuit 260 that acts as a common time reference, as also described further below. The clock 260 can be implemented in accordance with IEEE 1588 in an illustrative embodiment, although other standards are expressly contemplated. In general, a master clock within one device (the system master 112 for example), broadcasts the current time to the slave banks and associated processors. The other processors use their clock to determine the relative offset between their clocks and the master clock. Messages are exchanged according to the standard protocol to determine the correct time in each device.

Figure 3:
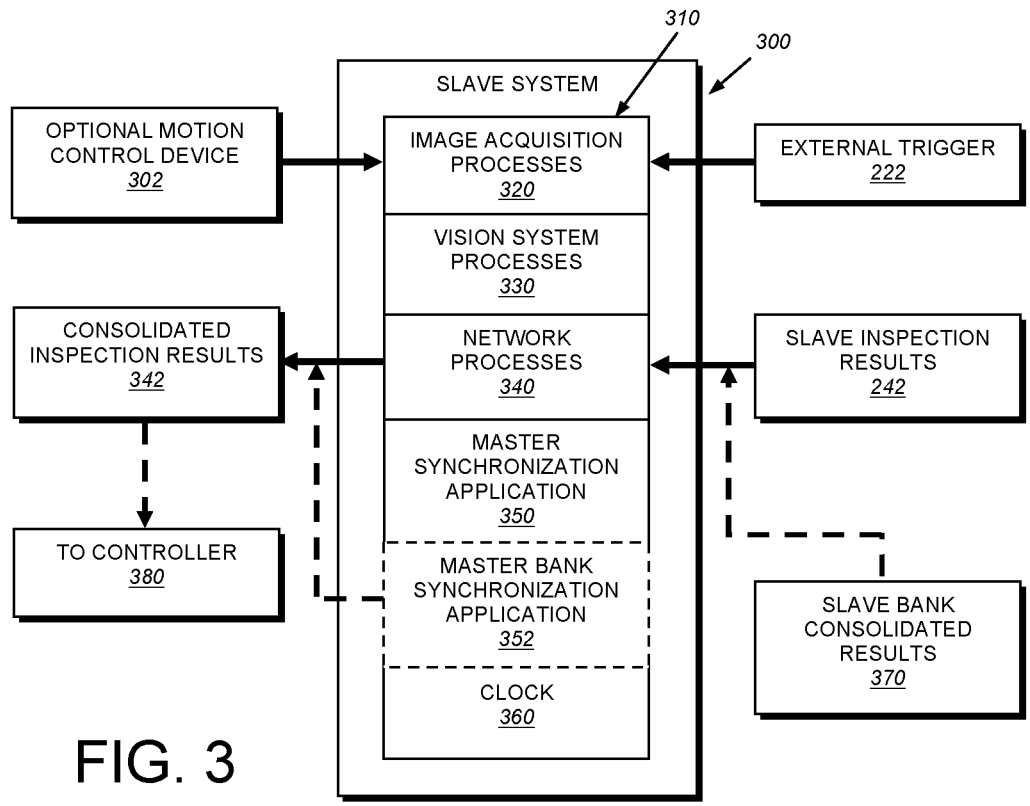
FIG. 3 is a block diagram showing the applications resident in an illustrative master processor system of FIG. 1.

FIG. 3 shows an illustrative master processor system 300 with an application stack 310. In general, the master processor is structurally and functionally similar to the slave processor(s) with some differences that enable it to operate as a bank master or overall system master in the arrangement of processors. The image acquisition process(es) operate similarly to the process(es) 220 above-described slave processor 200. They act upon internal and/or external triggers 222 to generate and store images of subjects. Vision system process (es) 330 also operate similarly to those (230) described above. Network processes (340) for the master 300 are adapted to transmit consolidated results 342 consisting of the results for the master itself and any slave results 242 addressed to the master. The receipt of slave results 242 are handled by the network processes 340 and passed to the master synchronization application, which can include the functions of the slave application 250 described above for handling self-generated results, but also handles the organization of received slave results from other processors as described below. The application 350 interacts with the common reference clock 360, which operates on the IEEE 1588 standard or another time reference so as to provide synchronization between interconnected processor systems. Where the clock 360 resides in the system master (112), the clock can act as the system master clock. Likewise, where the particular system 300 acts as the overall system master (112) the synchronization application 350 can include master bank synchronization processes 352 (shown in phantom) that are adapted to handle the consolidated results 370 from other slave banks (120, 130). In general, the master applications and synchronization processes can include various send and receive applications that handle data received from the slave processors and slave banks, and that transmit data on triggers and clocks to the slaves and transmit consolidated results to a controller. These consolidated results 370 consist of the bank master and slave results, transmitted by the bank master (122, 132) over the network. The transmitted consolidated results 342 then include all processor results from all banks, and these results are transmitted to the processor (block 380).

The operation of each slave processor system and master processor system in an inspection cycle is now described in further detail with reference to the flow diagrams of FIGS. 4 and 5, respectively. Referring first to the master procedure 400 (FIG. 4), the cycle begins (step 410) with the system awaiting a trigger signal (decision step 412). Upon receipt of a trigger (via decision step 412) the master system begins acquiring an image (step 414). The system also generates a unique identifier (step 416) and sends a trigger message to one or more slave systems (step 418). The message contains the generated identifier so as to uniquely identify the inspection cycle. The message can also contain a timestamp from the master system if the master and slave(s) share a common time reference such as the above-described IEEE 1588 clock arrangement. It may also contain a position reference such as an encoder position or motion controller coordinates. The generation and passing of the message over the network occurs while local image acquisition and processing are ongoing in the master. Note that a timestamp and/or position reference are advantageous where various cameras are triggered independently or in a known sequence. If results do not arrive with the proper timestamp or positional sequence then a result can be rejected—regardless of when the results are actually received over the network.

Figure 5:
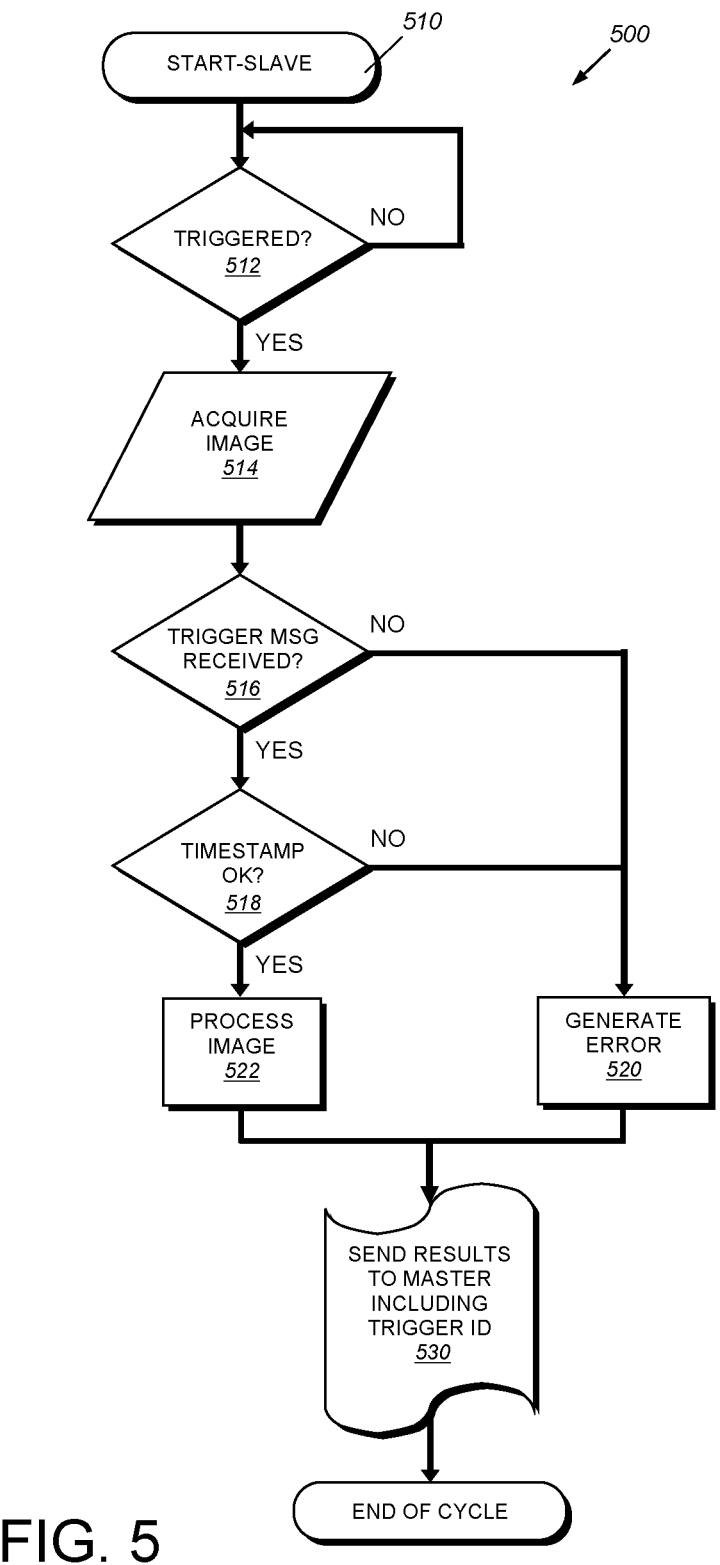
FIG. 5 is a flow diagram showing the operation of a slave processor system during an illustrative inspection cycle.

As shown in FIG. 5, the slave system procedure starts 510 after awaiting and receiving a trigger message or an external or internal trigger signal (decision step 512). The slave then begins to acquire the image (step 514). The procedure 500 records the timestamp and/or position reference, either contained in the trigger message or from the slave's own internal clock. The slave's image acquisition can be triggered directly by the message or by an external or internal signal, and it too is time stamped. When the slave's image acquisition is completed it determines whether a trigger message was received and whether its timestamp falls within a predetermined time or position window relative to the slave's trigger time or position (decision steps 516 and 518). The time/position window can be user-specified or arbitrarily defined, and it may be indefinite in either direction in order to allow for various triggering sequences. If no such message is received within the specified time/position window, an error is generated (step 520). Otherwise the slave processes the image (step 522), and sends results back to the master system including the inspection cycle's unique ID from the master's trigger message (step 530). This completes the particular Inspection cycle for that slave system, which now awaits the next trigger message (steps 510, 512).

Figure 4:
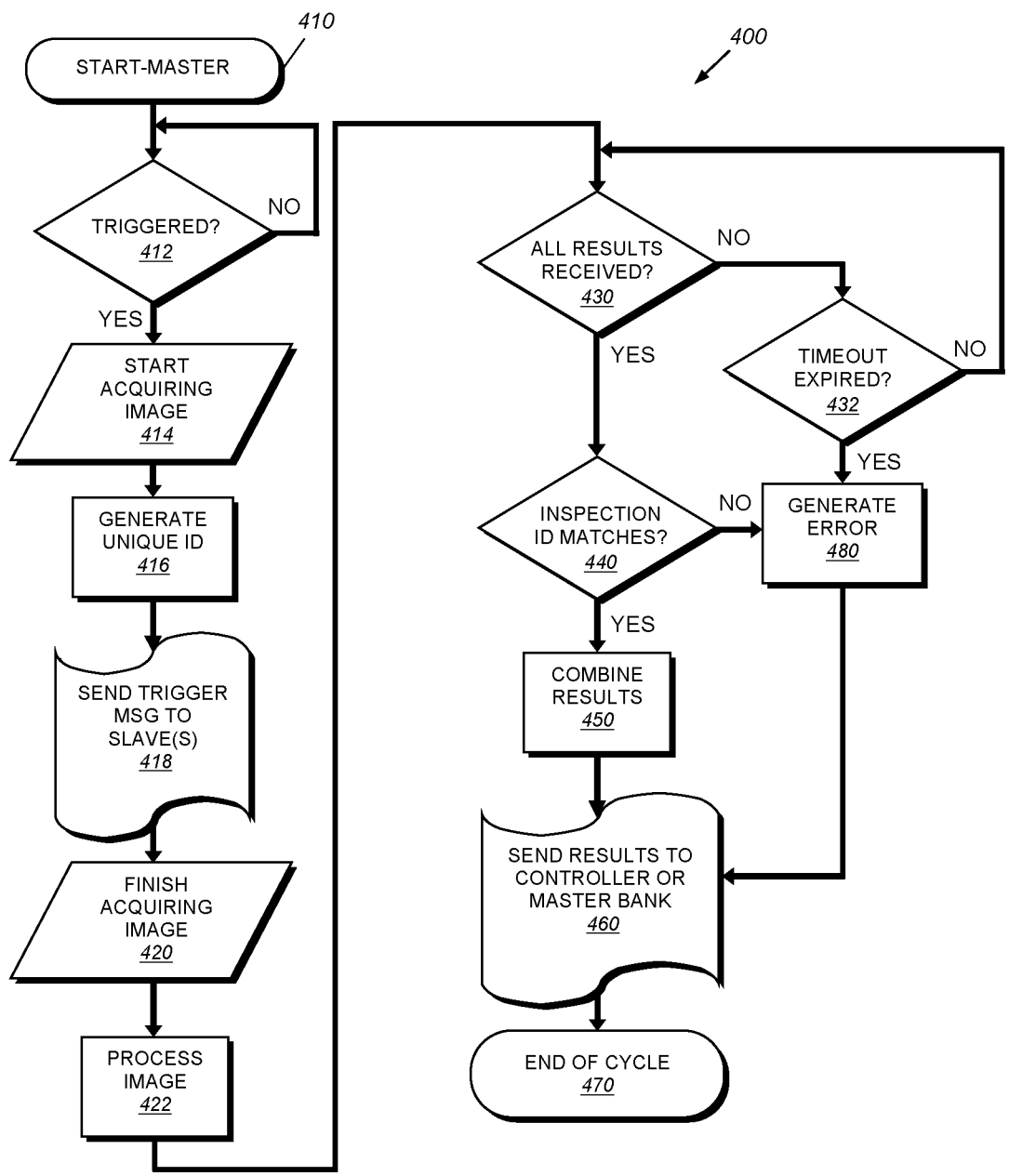
FIG. 4 is a flow diagram showing the operation of a master processor system during an illustrative inspection cycle.

Referring again to the master procedure 400 of FIG. 4, following step 418, in which a trigger message is sent to each slave system, the master finishes acquiring its own image (step 420) and processes the image using appropriate vision system processes. The procedure 400 can occur on the master bank master (system master) or on the master of a slave bank, as described further below, with the difference being the number of consolidated results and the final destination of the results. In the procedure 400, a result is generated from this processing step 422. The result includes the unique inspection ID and can include a timestamp generated by the master's clock. When the master is ready to combine results of its own inspection with results from one or more slave systems it first determines if all needed results are received (decision step 430). It waits for such results to be received up to a specified timeout or position. If needed results are received (decision step 430) within the timeout or position window (decision step 432), the procedure 400 verifies that the unique inspection ID from the slave(s) matches the master's inspection ID (from step 416) for the current inspection cycle (decision step 440). If the inspection IDs match, the results are accepted and combined results are generated by the master in step 450. This combination can be in the form of a data packet that is formatted in any acceptable manner to allow the information to be decoded by an interconnected device. It can include appropriate headers, tails and other formatted data fields. Where the procedure 400 is running on a slave bank master, the combined results are transferred to the master bank master (step 460), and combined according to step 450 on the master bank master. The results of the overall system combination can then be transferred to the controller in accordance with step 460 (running on the master bank master). In some embodiments, the overall system master may directly control external devices such as part reject mechanisms based on the combined results, without the need to communicate them to an external controller. The particular inspection cycle is then complete (step 470).

The procedures 400, 500 enable automatic detection and recovery from missing and spurious triggers to the master and/or slaves. If a slave misses a trigger or experiences a power interruption or a network packet loss of the result message, the master times out waiting for a response that never arrives (step 432) and generates an error (step 480). An error occurring in a slave bank is transferred to the master bank master (system master) by a slave bank master. It is then forwarded on via step 460 to the controller. If the error is generated by the master bank master (system master), then the error is directly forwarded on to the controller via step 460. If a slave receives an extra trigger or the master has a power interruption or network packet loss of the trigger message, the slave immediately detects the problem when it determines no received message within the specified trigger window and generates the error. In either case, the system will recover normal operation automatically within one or two inspection cycles.

More generally, multi-phase synchronization is accomplished when each master system within a phase bank is in turn a slave of a higher-level master. It is expressly contemplated that three or more layers of master and slave devices can be staged together. It is also expressly contemplated that the overall system master can be a separate controller or this function can be performed by the master system of one bank of processors, as shown in FIG. 1.

Figure 6:
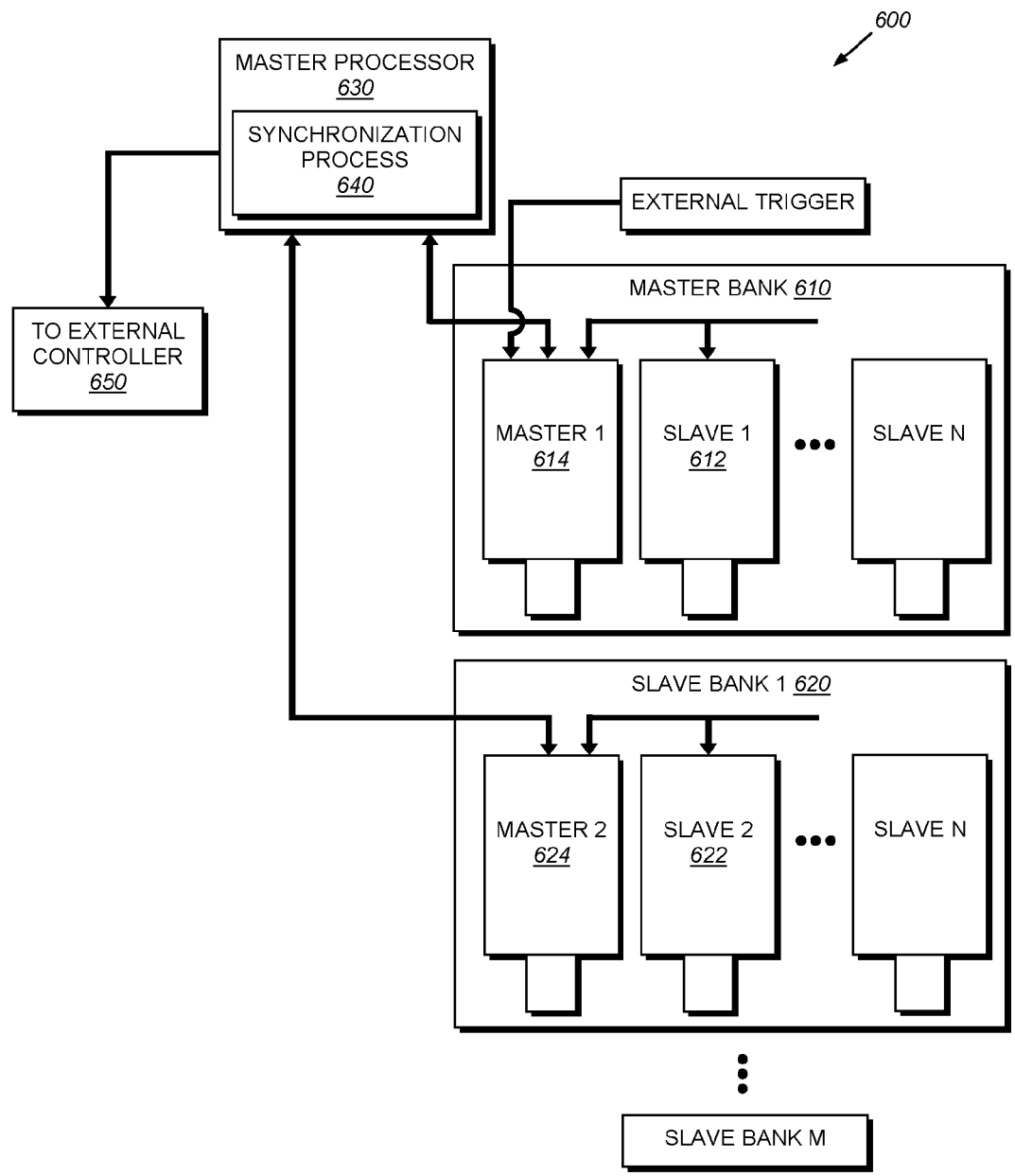
FIG. 6 is a block diagram of an arrangement of vision system processors according to an alternate embodiment in which a discrete master synchronization processor receives consolidated results from each of a plurality of multi-vision system processor banks.

Reference is made to FIG. 6, which depicts an alternate embodiment of a multiple vision system processor (and associated camera) arrangement 600. In this embodiment, a master bank 610 and at least one slave bank 620 are provided. The results of each slave processor 612, 622 are consolidated with those of the bank master 614, 624. The consolidated results of each bank's master is then combined in a discrete master processor 630 that operates the synchronization process 640 on the combined results in the same manner as the master procedure 400 in FIG. 4. In a further embodiment, all results can be routed to the master bank's master 614, but passed on to the processor 630 for final synchronization. The combined results, or any error condition, are passed from the master processor 630 to the external controller 650, as described generally above. The discrete processor can also generate the unique inspection cycle identifier and a timestamp based upon an internal reference clock.

It should be clear that the above-described arrangement provides a highly scalable and generally fault-tolerant system and method for implementing a multi-camera inspection system. The number of individual vision system cameras is highly variable and the number of layers of master and slave hierarchy is also highly variable. Unlike prior approaches that use an external PLC to synchronize inspections, this invention enables distributed vision subsystems to coordinate among themselves using a communication channel such as Ethernet. Likewise, unlike previous approaches, such as those employing WriteResult and ReadResult types of functions, the illustrative embodiments provide fault-tolerant communication regardless of how inspections are triggered, and can detect and recover from errors significantly faster. Moreover, the illustrative embodiment provides a unique and novel technique for multi-phase synchronization of inspection results.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the terms "master", "slave", "bank" and related terms are meant to be illustrative of various hierarchical and organizational arrangements of communication between a plurality of vision system processors, and not to be taken as absolute definitions of a particular structural arrangement. Moreover, the various procedures and processes described herein can be implemented using hardware, software, including computer-readable program instructions, or a combination of hardware and software. Accordingly, this description is meant to be taken only by way of example, and not to otherwise limit the scope of this invention.

What is claimed is:

1. A method for synchronizing results of a plurality of vision system processors, that processes acquired images, to generate results therefrom, comprising the steps of:
providing a master processor with a discrete master synchronization process associated therewith;
providing a slave camera bank interconnected to the discrete master processor and including at least one (a) master vision system processor and at least one (b) slave vision system processor interconnected thereto;
providing a master camera bank interconnected to the discrete master processor and including at least one (c) master vision system processor and at least one (d) slave vision system processor interconnected thereto;
in each inspection cycle, receiving, by each of the (a) master vision system processor, (b) slave vision system processor, (c) master vision system processor, and (d) slave vision system processor, a trigger signal, and in response thereto, acquiring and processing an image, the trigger signal including a unique inspection cycle identifier;
after acquiring and processing images with each of the (a) master vision system processor, (b) slave vision system processor, consolidating the results of the (a) master vision system processor, (b) slave vision system processor in the master bank and transmitting consolidated slave bank results to the master processor by a first communication link, the consolidated slave bank results including the unique inspection cycle identifier;
after acquiring and processing images with each of the (c) master vision system processor, and (d) slave vision system processor, consolidating the results of the (c) master vision system processor, and (d) slave vision system processor in the slave bank and transmitting consolidated master bank results to the master processor by a second communication link, the consolidated master bank results including the unique inspection cycle identifier;
with the master synchronization process associated with the discrete master processor, determining if the consolidated master bank results and the consolidated slave bank results are complete and that each of the inspection cycle identifiers is the same, and if the results are complete and the same, transmitting the complete results to a predetermined destination.

2. The method of claim 1, wherein the discrete master processor is discrete from the master bank and the slave bank.

3. The method of claim 1, further comprising:
providing at least a second slave camera bank interconnected to the discrete master processor and including at least one (e) master vision system processor and at least one (f) slave vision system processor interconnected thereto.

4. The method as set forth in claim 1 further comprising, if the synchronization process determines that at least one of (i) the results are not complete and (ii) each of the inspection cycle identifiers are not the same, indicating an error to a controller.

5. The method as set forth in claim 2 further comprising:
providing a common time reference to each of the (c) master vision system processor and the (d) slave vision system processor and appending a first timestamp to the consolidated master bank results based upon the common time reference; and
providing the common time reference to each of the (a) master vision system processor and the (b) slave vision system processor and appending a second timestamp to the consolidated slave bank results based upon the common time reference.

6. The method as set forth in claim 5 wherein the master synchronization process determines completeness of the consolidated master bank results and the consolidated slave bank results based upon known time sequence between each timestamp on each result.

7. The method as set forth in claim 1 wherein the trigger comprises an external trigger and wherein the method further comprises generating the external trigger from at least one of a group consisting of a presence detector that senses objects, an encoder that senses movement, and a motion control system with a positional reference.

8. The method as set forth in claim 1 further comprising performing an action with respect to the moving line based on the complete results at the predetermined destination.

9. The method as set forth in claim 1 further comprising a plurality of cameras each in association with the vision system processors that acquire images, wherein one or more of the cameras are either (a) positioned to view predetermined locations on a moving line, or (b) positioned by a motion control device to acquire images of predetermined locations.

10. The method as set forth in claim 1 further comprising:
providing a common positional reference to each of the (c) master vision system processor and the (d) slave vision system processor and appending a positional reference to the consolidated master bank results based upon the common positional reference;
providing the common positional reference to each of the (a) master vision system processor and the (b) slave vision system processor and appending a positional reference to the consolidated slave bank results based upon the common positional reference.

11. The method as set forth in claim 10 wherein the master synchronization process determines completeness of the consolidated master bank results and the consolidated slave bank results based upon a positional relationship between each positional reference on each result.

12. The method of claim 1, wherein the first communication link is discrete from the second communication link.

* * * * *